(12) United States Patent
Hill et al.

(10) Patent No.: US 7,898,702 B2
(45) Date of Patent: Mar. 1, 2011

(54) SCANNER

(75) Inventors: Edward A. Hill, San Diego, CA (US); David M. Lovelace, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 11/831,094

(22) Filed: Jul. 31, 2007

(65) Prior Publication Data

US 2009/0034019 A1 Feb. 5, 2009

(51) Int. Cl.
*H04N 1/04* (2006.01)
*H04N 1/46* (2006.01)

(52) U.S. Cl. ...................... 358/474; 358/505

(58) Field of Classification Search .......... 358/474, 358/505, 401, 488, 489, 490, 491, 494, 497
See application file for complete search history.

(56) References Cited

U.S. PATENT DOCUMENTS

| 4,640,504 | A | * | 2/1987 | Garavuso et al. ............ 271/113 |
| 4,704,638 | A | | 11/1987 | Igarashi |
| 5,513,458 | A | * | 5/1996 | Dehli ........................ 40/470 |
| 5,734,483 | A | | 3/1998 | Itoh |
| 7,016,088 | B2 | | 3/2006 | Yokota et al. |
| 7,019,872 | B2 | | 3/2006 | Haas et al. |

* cited by examiner

*Primary Examiner*—Douglas Q Tran (57) ABSTRACT

An apparatus and method relating to a least one wheel rotatable about a first axis while movably supporting a reflected light gathering unit extending along a second axis are disclosed.

19 Claims, 7 Drawing Sheets

SCANNER

BACKGROUND

Some scanners capture images using a mirror or lens to direct light reflected from a scanned surface to a sensor. Other scanners directly sense the reflected light with a one-one lens array (light gathering unit) and a sensor. Appropriately spacing the mirror, lens or a sensor from the scanned surface is sometimes difficult to achieve.

DETAILED DESCRIPTION OF THE EXAMPLE EMBODIMENTS

Figure 1:
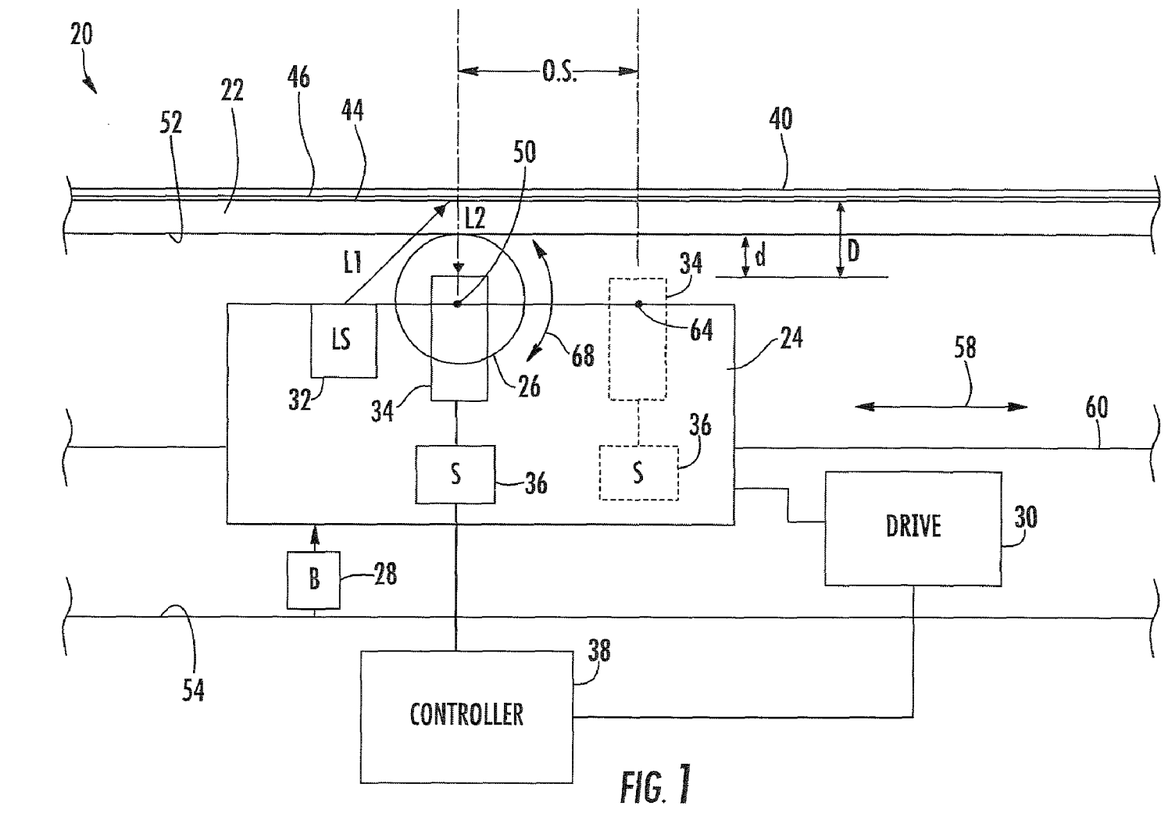
FIG. 1 is a side elevation view schematically illustrating a scanner system according to an example embodiment.

FIG. 1 schematic illustrates scanner system 20 according to an example embodiment. Scanner system 20 is configured to direct light onto a surface of a document or other article to be scanned and to sense the reflected light to electronically capture data or images from the scanned surface. As will be described hereafter, scanner system 20 provides more controlled spacing relative to the scanned surface for enhanced performance.

Scanner system 20 includes platen 22, carriage 24, wheels 26, bias 28, drive 30, light source 32, reflected light gathering unit 34, sensor 36 and controller 38. Platen 22 comprises a transparent panel or plate configured to support a document 40 or other article to be scanned. In one embodiment, platen 22 may comprise a transparent glass panel or plate. In another embodiment, platen 22 may comprise a transparent polymeric panel or plate.

Carriage 24 comprise a structure configured to carry at least reflected light gathering unit 34 as reflected light gathering unit 34 is being moved across and along platen 22. In the example illustrated, carriage 24 additionally supports light source 32 and sensor 36. In other embodiment, light source 32 and sensor 36 may be supported by other structures at distinct locations.

Wheels 26, one of which is shown, space carriage 24 and reflected light gathering unit 34 from platen 22 so as to space reflected light gathering unit 34 at an appropriate distance from a top surface 44 of platen 22 or a bottom surface 46 of document 40 upon platen 22. Wheels 26 are rotationally coupled to carriage 24 for rotation about axis 50. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Wheels 26 contact and bear against a lower surface 52 of platen 22 and are located outwardly beyond reflected light gathering unit 34. Wheels 26 provide lower reaction forces as compared to low friction pads or other structures, providing smoother motion of carriage 24 along with increased life and improve scan quality for scanner system 20.

In another embodiment, wheels 26 may alternatively contact and bear against another surface having a predefined spacing relative to surface 52 that extends in a plane parallel to lower surface 52 of platen 22. In one embodiment, system 20 may include a pair of such wheels 26. In another embodiment, system 20 may include a greater or fewer of such wheels 26.

Bias 28 comprises one or more members configured to resiliently bias or urge carriage 24, wheels 26 and unit 34 towards platen 22. As a result, wheels 26 are maintained in constant contact with surface 52 or another surface parallel to surface 52 as carriage 24 is moved across platen 22. In one embodiment, bias 28 may comprise one or more springs captured between carriage 24 and a stationary support surface 54 (schematically shown). In one embodiment, bias 24 may comprise a spring-loaded wheel carried by carriage 24 and rolling against surface 54. In other embodiment, bias 28 may have other configurations or may be omitted.

Drive 30 comprises one or more mechanisms configured to move carriage 24 in either direction as indicated by arrows 58. Drive 30 moves carriage 24 and reflected light gathering unit 34 across platen 22 such that a large portion of document 40 may be scanned. In one embodiment, drive 30 comprises a rack and pinion drive having a motor driving a pinion gear carried by carriage 24 against a rack gear generally extending along axis 60. In another embodiment, drive 60 may comprise a spur gear driving a toothed belt or a pulley driving a belt, wherein a portion of the belt is attached to carriage 24 such that driving of the belt moves carriage 24 along axis 60. In one embodiment, movement of carriage 24 May be further guided by a rod extending along axis 60. In other embodiment, drive 30 may comprise other mechanisms for moving carriage 24 along axis 60 generally parallel to the plane containing platen 22.

Light source 32, reflected light gathering unit 34 and sensor 36 form a scanning or sensing unit or system configured to capture an image by sensing the light applied to and reflected from document 40. Light source 32 comprises a source of light that is configured to direct light L1 towards surface 46 of document 40. Reflected light gathering unit 34 comprises one or more members or structures, such as lenses or mirrors, configured to gather, capture, direct or focus the light L2 from light source 32 after the light has been reflected from surface 46. Unit 34 directs the reflected light L2 to sensor 36. Sensor 36 senses the reflected light L2 and generates electrical signals based upon the reflected light. Such signals are transmitted to controller 38 which manipulates and/or stores such signals to form an electronic image representative of the image upon surface 46 of document 40.

As shown by FIG. 1, reflected light gathering unit 34 has a controlled spacing d from surface 52 of platen 22 which results in a controlled spacing D from surface 46 of document 40. As further shown by FIG. 1, unit 34 is substantially centered along and substantially extends along axis 50, the same axis about which wheels 26 rotate. As a result, unintended angular rotation or repositioning of carriage 24 about axis 50 which may be caused by manufacturing variations, molding variations, and assembly variations does not substantially impact the desired spacing d between unit 34 and surface 52 of platen 22 or the desired spacing D between unit 34 and surface 46 of document 40.

By lessening variability with regard to the spacing of unit 34 from platen 22 (distance d) or from document 40 (distance D), enhanced scanning performance or quality may be attained. For example, in one embodiment, light source 32, reflected light gathering unit 34 and sensor 36 may comprise a contact image sensor, wherein light source 32 comprises red, green and blue light emitting diodes (LEDs) which combine to provide white light and direct a light at document 40. Unit 34 comprises a rod lens which focuses the light onto sensor 36 which records images according to an intensity of light that hits sensor 36. In such an embodiment, the spacing between unit 34 and platen 22 (distance d) may be established to provide a desired depth of field. Variations from this spacing d may result in significant blurring of the generated image. Because unit 34 extends along substantially the same axis as the axis about which wheels 26 rotate, this variation is reduced for enhanced performance. Although system 20 is especially beneficial for systems employing such contact image sensors (CIS sensors), in other embodiments, system 20 may be utilized with other sensors.

As indicated in broken lines, in other embodiments, unit 34 may alternatively be centered and extend along an axis 64 that is spaced from axis 50 by an offset spacing OS. This offset spacing OS may enlarge variations from the desired spacings d or D resulting from angular rotation of carriage 24 about axis 50 in either direction as indicated by arrows 68 to two manufacturing or assembly variations. However, as the axis 64 along which unit 34 extends is moved closer to axis 50, this variation is reduced. According to one embodiment, the axis along which unit 34 extends may not be coextensive or coincident with the axis 50 about which wheels 26 rotate. However, in such an embodiment, the axis 64 along which unit 34 extends has an offset distance from axis 50 by less than or equal to about 5 mm As a result, scan quality and performance is enhanced as compared to other systems in which wheels 26 may be spaced farther from the axis of wheels 26.

Controller 38 comprises one or more processing units configured to generate control signals directing drive 30 to move carriage 24 and unit 34 across platen 22. Controller 38 is further configured to receive signals from sensor 36 so as to form or generate an electronic image based upon such signals. The generated electronic image may be stored in memory or may be used to print a copy of the image.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 38 may be embodied as part of one or more application-specific integrated circuits (ASICs). Unless otherwise specifically noted, the controller is not limited to any specific combination of hardware circuitry and software, nor to any particular source for the instructions executed by the processing unit.

FIGS. 2-6 illustrate scanner 120, a particular embodiment of scanner 20. Scanner 120 includes platen 122, carriage 124, wheels 126, bias 128, drive 130, light source 132, reflected light capture unit 134, sensor 36 (shown in FIG. 1) and controller 38 (shown and described with respect to FIG. 1). Shown by FIGS. 4-6, light source 132, reflected light capture unit 134 and sensor 36 are joined to one another to form a single's scanner module 135 which includes including a body 204 and wheels 126. Module 135 is carried by carriage 124. In other embodiments, scanner 120 may omit body 204, wherein the remaining components of module 135 are directly supported by carriage 124.

Figure 2:
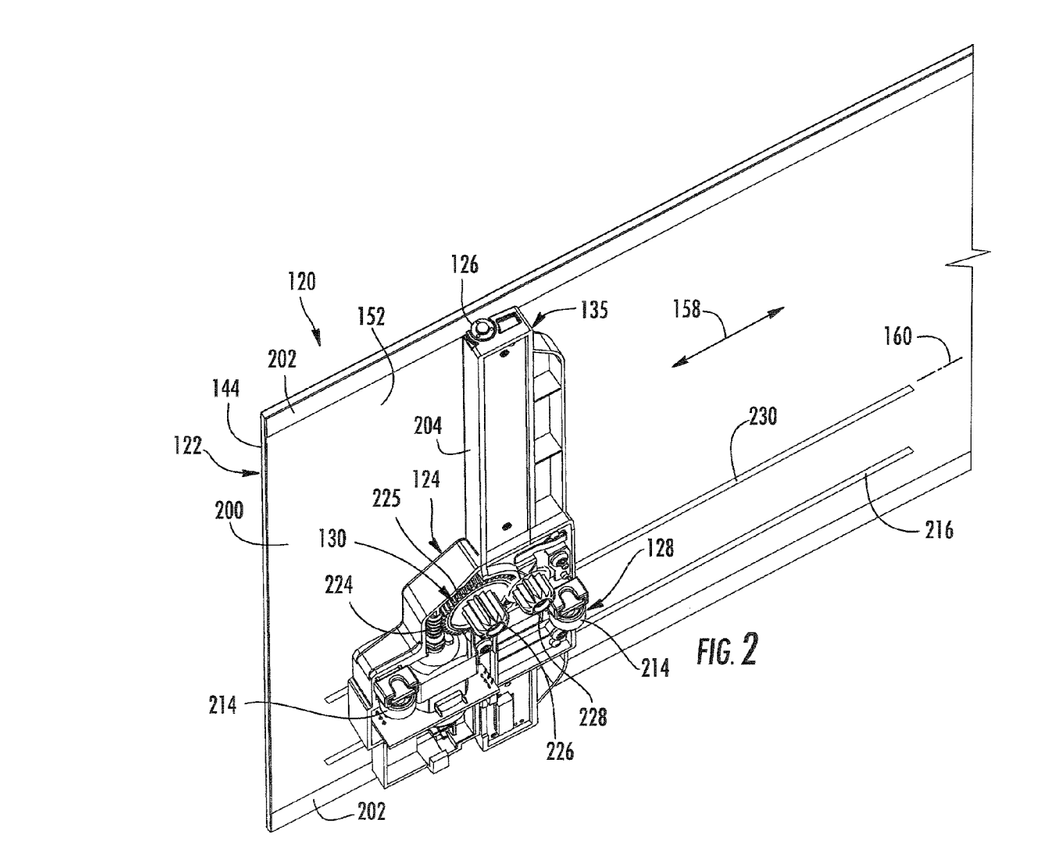
FIG. 2 has a first bottom perspective view of a particular embodiment of the scanner system of FIG. 1 according to an example embodiment.
Figure 3:
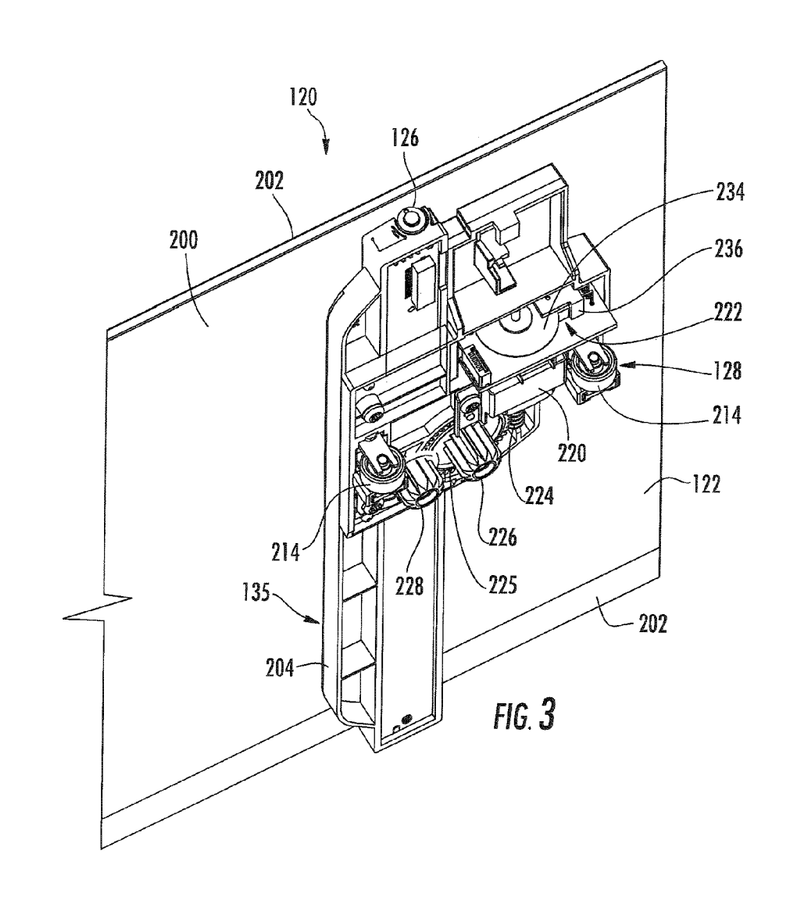
FIG. 3 is a second bottom perspective view of the scanner system of FIG. 2 according to an example embodiment.

Platen 122 comprises a panel or plate, at least a portion of which is transparent, configured to support a document or other article to be scanned. In the embodiment illustrated, platen 122 comprises a panel or plate having a central transparent portion 200 and transverse side portions 202. Central portion 200 comprises that portion of platen 122 through which light is transmitted and through which reflected light passes. Side portions 202 may be transparent or may be opaque. Side portions 202 provide surfaces against which wheels 126 rotate. In the embodiment illustrated, side portions 202 have surfaces coplanar with a lower surface 152 of central portion 200. In another embodiment, side portions 202 may be at different levels as compared to surface 152 of central portion 200.

Carriage 124 comprise a structure configured to carry at least reflected light gathering unit 134 as reflected light gathering unit 134 is being moved across and along platen 122. In the example illustrated, carriage 124 additionally supports light source 132 and sensor 136. In the particular example illustrated, carriage 124 carries scanned module 135 as well as portions of bias 128 and drive 130. In other embodiment, light source 132 and sensor 136 may be supported by other structures at distinct locations.

Figure 6:
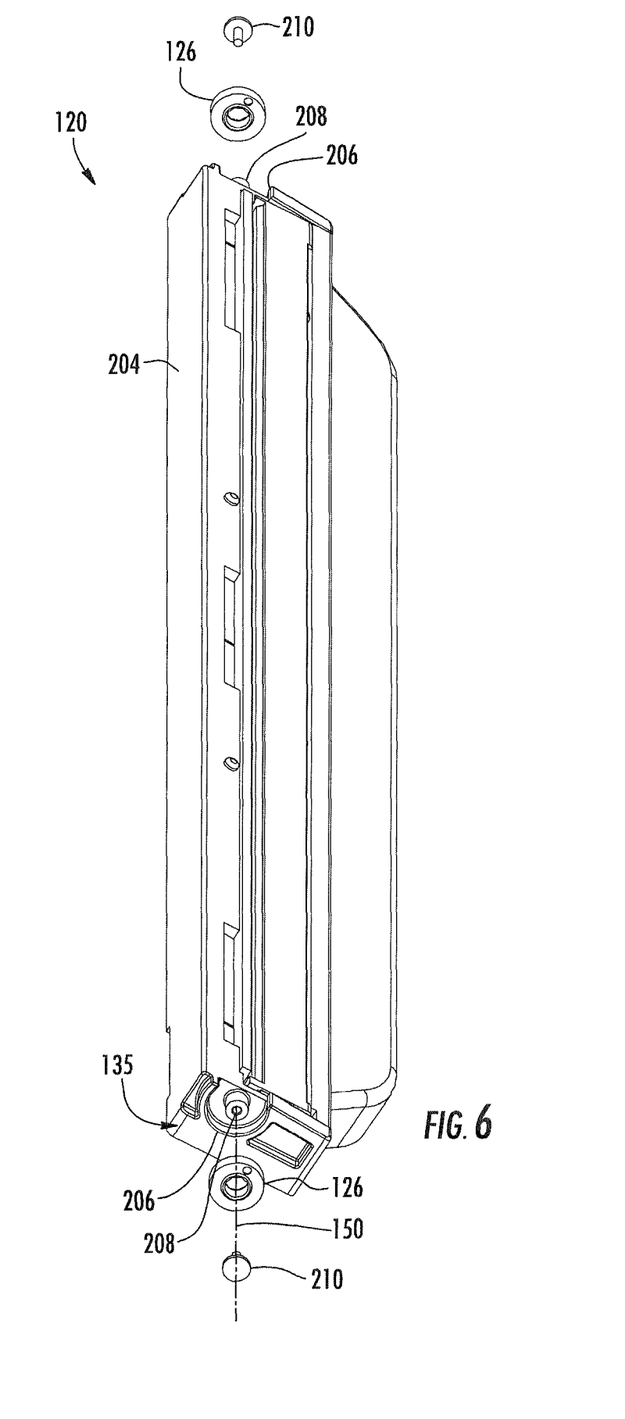
FIG. 6 is an exploded perspective view of the scanner system of FIG. 4 according to an example embodiment.
Figure 7:
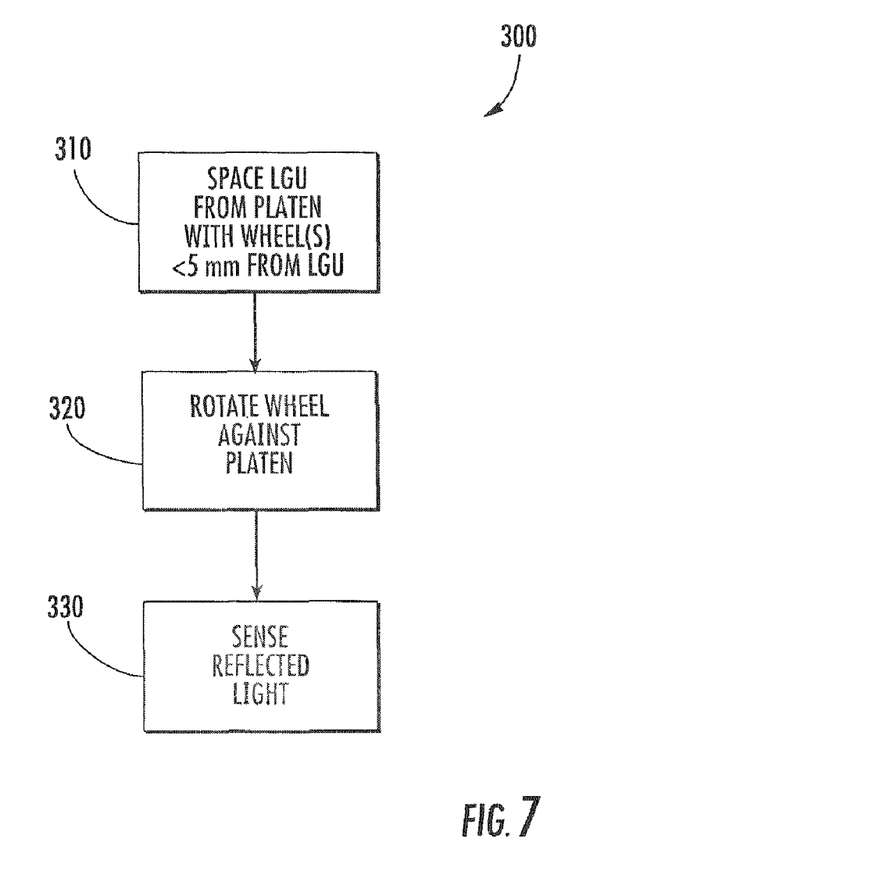
FIG. 7 is a flow chart of a scanning method 300.

As shown by FIG. 6, scan unit 135 includes body 204, two opposing indentations, recesses, cavities or wheel wells 206 and two oppositely extending axles 208. Wells 206 extend into body 204 and are sized to receive wheels 126. Axles 208 are located within wells 206 and provide a center of rotation for wheels 126. Axles 208 axially extend along axis 150. Because wells 208 extend into body 204 and because axles or more 208 extend within wells 206, wheels 126 may be axially positioned closer to one another. As a result, wheels 126 may be positioned in close proximity to axial ends of reflected light capturing unit 134. Consequently, the axial length of the assembled scan unit 135 and wheels 126 is reduced, permitting scanner system 120 to be compact. In other embodiment, wells 206 may be omitted.

In one embodiment, axles 208 are integrally formed as part of a single unitary body with body 204 of scan unit 135. As a result, manufacturing costs and assembly costs is reduced. In addition, enhanced control over the mounting locations of wheels 126 is achieved. In other embodiments, axles 208 may be separate structures that are fastened, bonded, welded or otherwise secured to body 204.

Wheels 126 space carriage 124 and reflected light gathering unit 134 from a top surface 144 of platen 122 and from a bottom surface of the document upon platen 122. Wheels 126 are rotationally coupled to carriage 124 for rotation about axis 150. Wheels 126 contact and bear against a lower surface of side portions 202 of platen 122 and are located outwardly beyond reflected light gathering unit 134. Wheels 126 provide lower reaction forces as compared to low friction pads or other structures, providing smoother motion of carriage 124 along with increased life and improve scan quality for scanner system 120.

As shown by FIG. 6, wheels 126 comprise annular members configured to be rotationally received about axles 208. In one embodiment, wheels 126 are formed from a relatively incompressible rigid material such as acetal. In other embodiment come wheels 126 may be formed from other materials.

As further shown by FIG. 6, wheels 126 are retained upon axles 208 by caps 210. Caps 210 snap into central openings within axles 208 and have enlarged head portion so as to capture wheels about axles 208. As a result, 210 retain wheels 126 on axles 208 without substantially projecting beyond the outermost faces of wheels 126, reducing the axial length of the assembled carriage 124 and wheels 126 to reduce the width of scanner system 20. In other embodiments, wheels 126 may be rotationally connected to carriage 124 in other manners.

Figure 4:
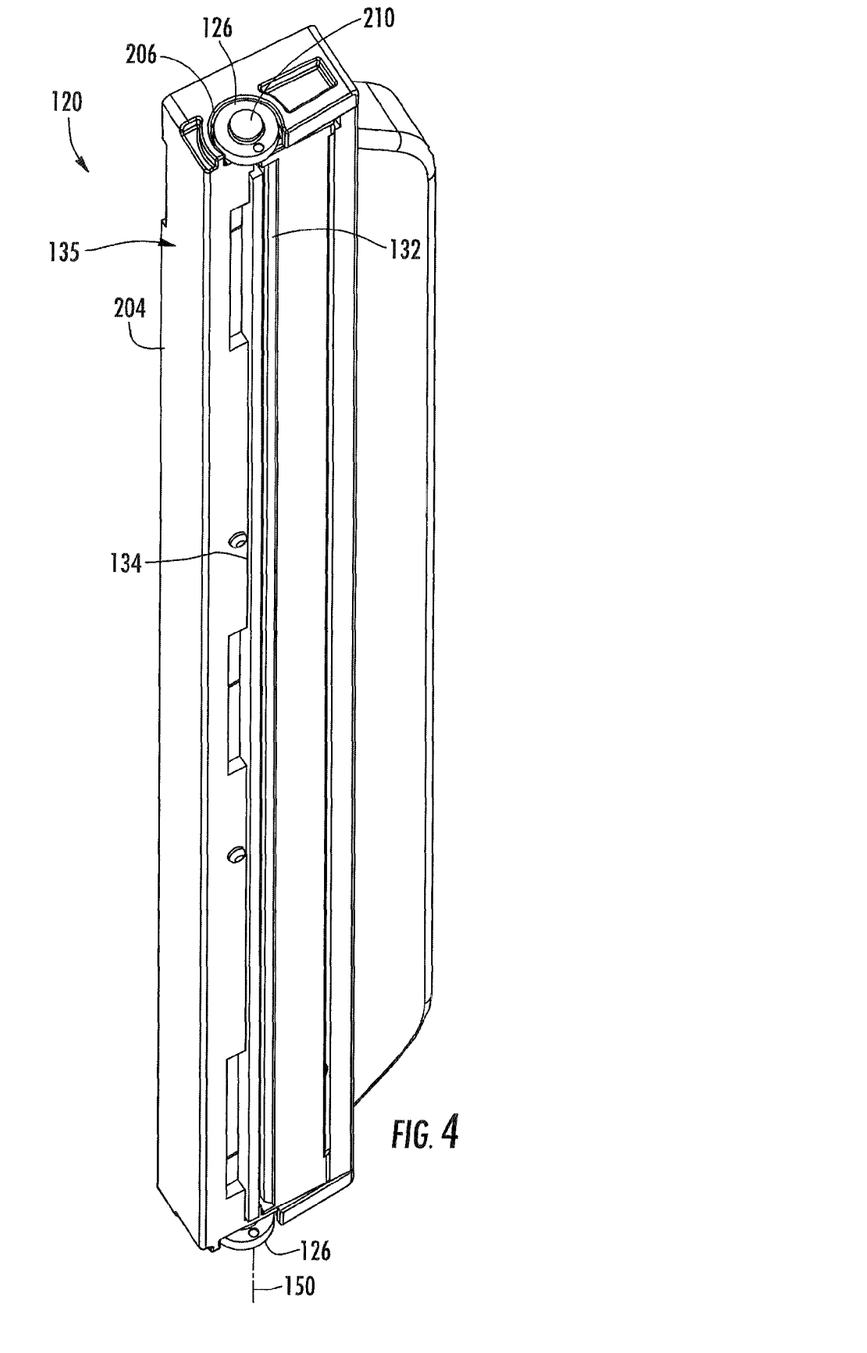
FIG. 4 is a top perspective view of a portion of the scanner system of FIG. 2 according to an example embodiment.
Figure 5:
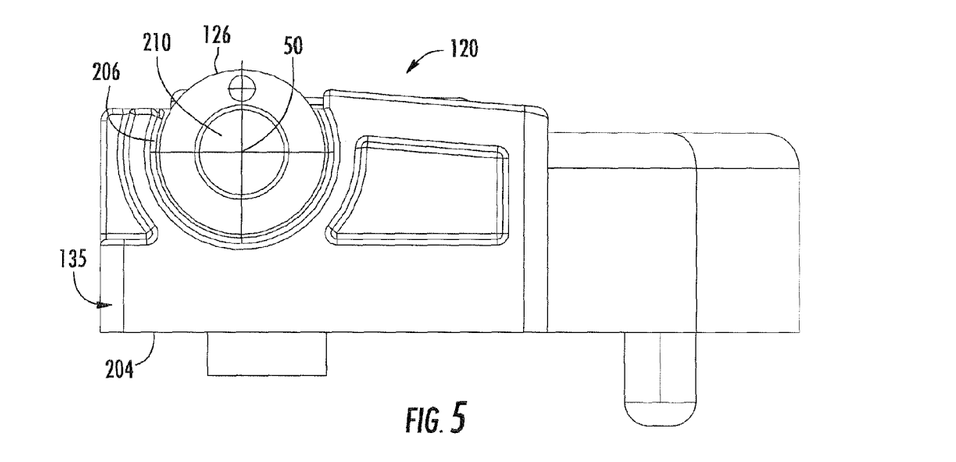
FIG. 5 is a side elevation will view of the scanner system of FIG. 4 according to an example embodiment.

Bias 128 comprises one or more members configured to resiliently biased or urge carriage 124, wheels 126 and unit 134 towards platen 122. As a result, wheels 126 are maintained in constant contact with surface 152 or another surface parallel to surface 152 as carriage 124 is moved across platen 122. In the example illustrated, bias 128 comprises a pair of spring-loaded wheels 214 located on opposite sides of axis 50. In one embodiment, wheels 214 are his only biased by compression springs oriented perpendicular to platen 122 which are captured between wheels 214 and body 204 of carriage 124 so as to urge wheels 214 against a stationary surface 216 (schematically shown) associated with the housing of scanner system 20. In other embodiments, bias 28 may be of other configurations or may be omitted.

Drive 130 comprises one or more mechanisms configured to move carriage 124 in either direction as indicated by arrows 158. Drive 130 moves carriage 124 and reflected light gathering unit 134 across platen 122 such that a larger portion of a document may be scanned. In the embodiment illustrated, drive 130 includes motor 220, encoder 222, worm gear 224, helical gear 225, pinion gears 226, 228 and rack gear 230 (schematically shown in FIG. 2). Motor 220 is carried by carriage 124 and is connected to encoder 222 at one end. In example illustrated, encoder 222 includes an encoder disc 234 and a sensor 236. Encoder 222 senses rotation of the output shaft of motor 220 which is connected to worm gear 224. Worm gear 224 is an engagement with helical gear 225 which is part of a cluster gear connected to gear 226 and is further connected to pinion gear 228. Pinion gears 226 and 228 are in engagement with rack gear 230 yes. Rotation of pinion gears 226, 228 results in carriage 124 being driven along rack gear 230 relative to platen 122.

In another embodiment, drive 130 may comprise a spur gear driving a toothed belt or pulley driving a belt, wherein a portion of the belt is attached to carriage 124 such that carriage 124 moves along axis 160. In one embodiment, movement of carriage 124 May be further guided by a rod extending along axis 160. In other embodiment, drive 130 may comprise other mechanisms for moving carriage 124 along axis 160 generally parallel to the plane containing platen 122.

Light source 132, reflected light gathering unit 134 and sensor 36 (schematically shown in FIG. 1) form a scanning or sensing unit or system configured to capture an image by sensing the light applied to and reflected from a document upon platen 122. Light source 132 comprises a source of light that is configured to direct light towards a surface of a document. Reflected light gathering unit 134 comprises one or more members are structures configured to gather, capture, direct or focus the light from light source 132 after the light has been reflected from the document. Unit 134 directs the reflected light to sensor 36. Sensor 36 senses the reflected light and generates electrical signals based upon the reflected light. Such signals are transmitted to controller 38 which manipulates and/or stores such signals to form an electronic image representative of the image upon the document.

As shown by FIG. 4, unit 134 is substantially centered along and substantially extends along axis 150, the same axis about which wheels 126 rotate. As a result, unintended angular rotation or repositioning of carriage 124 about axis 150 which may be caused by manufacturing variations, molding variations, and assembly variations does not substantially impact desired spacing d between unit 134 and surface 152 of platen 122 or the desired spacing between unit 134 and the surface of the document being scanned. By lessening variability with regard to the spacing of unit 134 from platen 122 enhanced scanning performance or quality may be attained.

In the particular example illustrated, light source 132, reflected light gathering unit 134 and sensor 36 comprise a contact image sensor, wherein light source 132 comprises red, green and blue light emitting diodes (LEDs) which combine to provide white light and direct a light at the document being scanned. Unit 134 comprises a rod lens which focuses the light onto sensor 36 which records images according to an intensity of light that hits sensor 36. In such an embodiment, the spacing between unit 134 and platen 122 may be established to provide a desired depth of field. Variations from this spacing d may result in significant blurring of the generated image. Because unit 134 extends along substantially the same axis as the axis about which wheels 126 rotate, this variation is reduced for enhanced performance. Although system 120 is especially beneficial for systems employing such contact image sensors (CIS sensors), in other embodiments, system 120 may be utilized with other sensors.

In other embodiments, unit 134 may alternatively be centered and extend along an axis that is spaced from axis 150 by an offset spacing. This offset spacing may enlarge variations from the desired spacing between unit 134 and the bottom of platen 122 resulting from angular rotation of carriage 124 about axis 150 in either direction due to manufacturing or assembly variations. However, as the axis along which unit 134 extends is moved closer to axis 150, this variation is reduced. According to one embodiment, the axis along which unit 134 extends may not be coextensive or coincident with the axis 150 about which wheels 126 rotate. However, in such an embodiment, the axis along which unit 134 extends has an offset distance from axis 150 by less than or equal to about 5 mm. As a result, scan quality and performance is enhanced.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A scanner system comprising:

a transparent platen;

a reflected light gathering unit extending along a first axis and movable along a second axis relative to the platen; and a first wheel coupled to the unit and rotatable along the platen about a second axis spaced less than or equal to about 5 mm from the first axis.

2. The system of claim 1, wherein the first axis and the second axis are substantially coextensive.

3. The system of claim 1, wherein the reflected light gathering unit comprises a lens.

4. The system of claim 3 further comprising a contact image sensor configured to receive light from the lens.

5. The system of claim 1, wherein the unit is resiliently biased towards the platen.

6. The system of claim 1 further comprising a second wheel coupled to the unit and rotatable along the platen the platen about the second axis.

7. The system of claim 1 further comprising a carriage carrying the reflected light gathering unit.

8. The system of claim 1, wherein the carriage includes a body forming a cavity, wherein the first wheel is received within the cavity such that the body extends opposite a single face of the wheel.

9. The system of claim 7, wherein the body forms an axle about which the wheel rotates.

10. The system of claim 8 further comprising a fastener securing the wheel to the axle, the fastener axially recessed within the wheel.

11. The system of claim 7 further comprising a drive configured to move the carriage across the platen.

12. The system of claim 11, wherein the drive comprises:
a rack gear; a
a pinion gear carried by the carriage and in engagement with the rack gear; and
a motor configured to drive the pinion gear.

13. A method comprising:
spacing a reflected light gathering unit extending along the first axis from a platen with at least one wheel;
rotating the at least one wheel along a second axis spaced less than or equal to about 5 mm from the first axis; and
sensing reflected light gathered by the unit.

14. The method of claim 13 wherein the at least one wheel includes a first wheel and a second wheel along a second axis.

15. The method of claim 13 wherein the sensing of reflected light is with a contact image sensor.

16. The method of claim 13, wherein the reflected light gathering unit comprises a lens.

17. The method of claim 13, wherein the first axis and the second axis are substantially coextensive.

18. The method of claim 13 further comprising resiliently biasing the reflected light gathering unit towards the platen.

19. The method of claim 13 further comprising supporting the reflected light gathering unit with a carriage, wherein the at least one wheel is received within a cavity of the carriage.

* * * * *

UNITED STATES PATENT AND TRADEMARK OFFICE
CERTIFICATE OF CORRECTION

| | | |
|---|---|---|
| PATENT NO. | : 7,898,702 B2 | Page 1 of 1 |
| APPLICATION NO. | : 11/831094 | |
| DATED | : March 1, 2011 | |
| INVENTOR(S) | : Edward A. Hill et al. | |

It is certified that error appears in the above-identified patent and that said Letters Patent is hereby corrected as shown below:

In column 7, line 16, in Claim 6, delete "the platen the platen" and insert -- the platen --, therefor.

In column 8, line 4, in Claim 12, after "gear;" delete "a".

Signed and Sealed this
Thirtieth Day of August, 2011

David J. Kappos
*Director of the United States Patent and Trademark Office*